US010643760B2

(12) United States Patent
Doki et al.

(10) Patent No.: US 10,643,760 B2
(45) Date of Patent: May 5, 2020

(54) METHOD OF PRODUCING DIFFRACTION GRATING

(71) Applicant: Shimadzu Corporation, Kyoto (JP)

(72) Inventors: Takahiro Doki, Kizugawa (JP);
Yukihisa Wada, Soraku-gun (JP);
Satoshi Tokuda, Kusatsu (JP);
Nobukazu Hayashi, Kyoto (JP);
Toshinori Yoshimuta, Takatsuki (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 222 days.

(21) Appl. No.: 15/890,376

(22) Filed: Feb. 7, 2018

(65) Prior Publication Data

US 2018/0226167 A1    Aug. 9, 2018

(30) Foreign Application Priority Data

Feb. 8, 2017  (JP) .................... 2017-021675

(51) Int. Cl.
*G21K 1/06* (2006.01)
*G02B 5/18* (2006.01)
*G01B 15/00* (2006.01)
*G21K 1/02* (2006.01)

(52) U.S. Cl.
CPC ............. *G21K 1/062* (2013.01); *G01B 15/00* (2013.01); *G21K 1/025* (2013.01); *G21K 1/06* (2013.01); *G21K 2207/005* (2013.01)

(58) Field of Classification Search
CPC .......... G21K 1/06; G21K 1/062; G21K 1/067; G21K 1/025; G21K 2207/005; G01B 15/00; G02B 5/1857; G02B 5/1838
See application file for complete search history.

(56) References Cited

U.S. PATENT DOCUMENTS

| 2005/0286680 A1* | 12/2005 | Momose | ................ A61B 6/06 378/62 |
| 2013/0093936 A1* | 4/2013 | Scheeline | ............... G01J 3/42 348/345 |
| 2014/0286477 A1* | 9/2014 | Ishii | ..................... G01N 23/04 378/62 |

FOREIGN PATENT DOCUMENTS

| WO | WO2009/104560 A1 | 8/2009 | |
| WO | WO-2012026223 A1 * | 3/2012 | ........... A61B 6/4291 |

OTHER PUBLICATIONS

Pfeiffer et al. "Phase retrieval and differential phase-contrast imaging with low-brilliance X-ray sources," Nature Physics vol. 2, pp. 258-261, Apr. 2006.

* cited by examiner

*Primary Examiner* — Bayan Salone
(74) *Attorney, Agent, or Firm* — Muir Patent Law, PLLC

(57) ABSTRACT

The method of producing this diffraction grating includes a step of generating a moire by a periodic pattern projected onto a plurality of unit diffraction gratings and a plurality of unit diffraction gratings, and a step of adjusting so that the extending directions of the gratings are aligned by relatively rotating at least one of a plurality of unit diffractions with respect to at least one of the others of the plurality of unit diffractions.

18 Claims, 11 Drawing Sheets

METHOD OF PRODUCING DIFFRACTION GRATING

CROSS-REFERENCE TO RELATED APPLICATIONS

The present application claims priority to Japanese Patent Application No. 2017-021675, entitled "Production method of diffraction grating", filed on Feb. 8, 2017, and invented by Takahiro Doki, Yukihisa Wada, Satoshi Tokuda, Nobukazu Hayashi, and Toshinori Yoshimuta, the contents of which are incorporated herein by reference in their entirety.

BACKGROUND OF THE INVENTION

Field of the Invention

The present invention relates to a method of producing a diffraction grating.

Background Technique

Conventionally, a diffraction grating provided in an X-ray imaging apparatus is known. Such a diffraction grating is disclosed in, for example, International Publication No. 2009/104560.

International Publication No. 2009/104560 discloses an X-ray imaging apparatus equipped with an X-ray source for generating an X-ray, a first grating for diffracting the X ray generated from the X-ray source, and a second grating for generating a moire pattern by further diffracting the X-ray diffracted by the first grating, and an X-ray image detector for detecting a moire pattern generated by the second grating. The X-ray imaging apparatus disclosed in International Publication No. 2009/104560 is configured to generate an X-ray image including an X-ray phase contrast image obtained by imaging the phase shift of the X-ray caused by passing through an object from a moire pattern obtained when the object is X-ray captured in a state in which the object is placed between the X-ray source and the first grating or between the first grating and the second grating and the moire pattern obtained when the object is X-ray captured in a state in which the object is not placed therebetween.

In the X-ray imaging apparatus like International Publication No. 2009/104560, for the purpose of enlarging the field range that can be image captured at once, there is a need to increase the imaging range by forming a moire pattern in a wide range by increasing the area of the second grating arranged upstream and near the X-ray image detector. Therefore, as a method for increasing the imaging area, a method can be conceivable in which a plurality of diffraction gratings (unit diffraction gratings) is fixed to a common substrate to thereby increase the imaging area.

However, in an X-ray imaging apparatus as disclosed in International Publication No. 2009/104560, in the case of configuring the second grating so that a plurality of diffraction gratings (unit diffraction gratings) is arranged on a common substrate, a moire pattern is generated by further diffracting the X-ray diffracted by the first grating with the second grating. However, in the X-ray imaging apparatus as disclosed in International Publication No. 2009/104560, in cases where it is not adjusted so that the extending directions of the gratings of a plurality of diffracting gratings of the second grating are aligned, it is considered that there is a problem that deterioration of image quality occurs due to distortion in the X-ray image due to a difference in moire pattern for each diffraction grating.

SUMMARY OF THE INVENTION

The present invention was made to solve the aforementioned problems, and an object of the present invention is to provide a method of producing a diffraction grating capable of suppressing degradation of image quality due to a difference in shape of a moire in an X-ray image while enlarging an area.

In order to achieve the aforementioned object, a method of producing a diffraction grating according to one aspect of the present invention includes: a step of generating a moire by a periodic pattern projected onto a plurality of unit diffraction gratings and a plurality of unit diffraction gratings; and a step of adjusting so that extending directions of gratings are aligned by relatively rotating at least one of a plurality of unit diffraction gratings with respect to at least one of the others of the plurality of unit diffraction gratings based on a shape of the moire generated.

In a method of producing a diffraction grating according to one aspect of the present invention, as described above, it is configured to provide a step of adjusting so that the extending directions of the gratings are aligned by relatively rotating at least one of the plurality of unit diffraction gratings with respect to at least one of the others of the plurality of unit diffraction gratings based on a shape of the moire generated. By this step, it is possible to produce a diffraction grating in which at least two of the plurality of unit diffraction gratings are arranged so that the moire shapes are substantially equal. As a result, it is possible to increase the area of the diffraction grating while avoiding degradation of image quality due to the difference in shape of the moire. Also, unlike the case in which the extending directions of the gratings of a plurality of unit diffraction gratings are directly adjusted using a microscope and a marker, it is possible to adjust the extending directions of gratings of the plurality of unit diffraction gratings based on the shapes of actually formed moires. With this, it is possible to assuredly suppress occurrence of misalignment in extending directions of gratings of a plurality of unit diffraction gratings.

In a method of producing a diffraction grating equipped with a step of relatively rotating at least one of a plurality of unit diffraction gratings, it is preferable that a plurality of unit diffraction gratings include a first unit diffraction grating and a second unit diffraction grating, and the step of relatively rotating the at least one of the plurality of unit diffraction gratings includes a step of adjusting so that the extending directions of gratings are aligned by relatively rotating the first unit diffraction grating with respect to the second unit diffraction grating based on a period of a first moire generated by the first unit diffraction grating and the periodic pattern and a period of the second moire generated by the second unit diffraction grating and the periodic pattern. With this configuration, it is possible to easily align the extending directions of the gratings of the first unit diffraction grating and the second unit diffraction grating by adjusting so that the extending directions of the gratings of the first unit diffraction grating and the second unit diffraction grating are aligned based on the period of the first moire and the period of the second moire which are larger than the period of the grating of the first unit diffraction grating and the period of the grating of the second unit diffraction grating.

In the method of producing a diffraction grating including a step of relatively rotating the first unit diffraction grating with respect to the second unit diffraction grating, it is preferable that the method further includes a step of fixing the first unit diffraction grating with respect to the substrate. The step of relatively rotating the first unit diffraction grating with respect to the second unit diffraction grating includes a step of adjusting so that the extending directions of the gratings are aligned by relatively rotating the second unit diffraction grating with respect to the substrate and the first unit diffraction grating fixed to the substrate, and a step of fixing the second unit diffraction grating with respect to the substrate after the step of adjusting so that the extending directions of the gratings are aligned by relatively rotating the second unit diffraction grating with respect to the first unit diffraction grating.

By configuring as described above, since the first unit diffraction grating is fixed to the substrate before the step of relatively rotating the first unit diffraction grating with respect to the second unit diffraction grating, even if the first unit diffraction grating is relatively rotated with respect to the second unit diffraction grating, the position of the first unit diffraction grating with respect to the substrate does not change. As a result, it is possible to suppress occurrence of misalignment of the extending directions of the gratings of the first unit diffraction grating and the second unit diffraction grating.

Further, the second unit diffraction grating is fixed to the substrate after the alignment of the extending directions of the gratings of the first unit diffraction grating and the second unit diffraction grating, and therefore it is possible to assuredly produce a diffraction grating in a state in which the extending directions of the gratings of the first unit diffraction grating and that of the second unit diffraction grating are aligned.

In the method of producing a diffraction grating further including a step of fixing the second unit diffraction grating to the substrate with respect to the first unit diffraction grating, it is preferable that the step of adjusting so that the extending directions of the gratings are aligned by relatively rotating the second unit diffraction grating with respect to the first unit diffraction grating fixed to the substrate includes a step of rotating the second unit diffraction grating in a state in which the substrate and the first unit diffraction grating are fixed.

By configuring as described above, since it is only required to rotate the second unit diffraction grating which is not fixed based on the substrate to which the first unit diffraction grating is fixed, it is possible to easily perform a step of relatively rotating the substrate and the second unit diffraction grating.

In the method of producing a diffraction grating further including a step of fixing the second unit diffraction grating to the substrate with respect to the first unit diffraction grating, it is preferable that the step of adjusting so that the extending directions of the gratings are aligned by relatively rotating the second unit diffraction grating with respect to the first unit diffraction grating fixed to the substrate includes a step of rotating the substrate and the first unit diffraction grating in a state in which the second unit diffraction grating is fixed.

By configuring as described above, since it is only required to rotate the substrate with reference to the second unit diffraction grating, by rotating the substrate with respect to the second unit diffraction grating in a state in which the second unit diffraction grating is held, it is possible to easily perform a step of relatively rotating the substrate and the second unit diffraction grating.

Further, in cases where a device configured such that a diffraction grating is rotatable in a grating plane in order to change the shape of a moire is used for an X-ray phase imaging device of the present invention, it is possible to rotate the substrate in a grating plane. With this, by using the X-ray phase imaging device, in a state in which the second unit diffraction grating is held, it is possible to rotate the substrate and the first unit diffraction grating fixed to the substrate in a state in which the second unit diffraction grating is held without separately providing a first unit diffraction grating to a rotation mechanism.

In the method of producing a diffraction grating further including a step of fixing the second unit diffraction grating to the substrate with respect to the first unit diffraction grating, it is preferable that the plurality of unit diffraction gratings further include a third unit diffraction grating other than the first unit diffraction grating and the second unit diffraction grating, and the method further includes a step of adjusting so that the extending directions are aligned by relatively rotating the third unit diffraction grating with respect to the first unit diffraction grating or the second unit diffraction grating fixed to the substrate after the step of fixing the second unit diffraction grating to the substrate, and a step of fixing the third unit diffraction grating with respect to the substrate after the step of adjusting so that the extending directions of the gratings are aligned by relatively rotating the third unit diffraction grating relative with respect to the first unit diffraction grating or the second unit diffraction grating.

By configuring as described above, by repeating these steps, it is possible to sequentially fix the plurality of unit diffraction gratings other than the first unit diffraction grating with respect to the substrate to which the first unit diffraction grating is fixed in a state in which the extending directions of the gratings are aligned. As a result, it is possible to obtain a diffraction grating in which the extending directions of the gratings are aligned for all of the plurality (three or more) unit diffraction gratings.

Further, in this process, even if an error occurs in the step of aligning the extending directions of gratings of the second unit diffraction grating and the first unit diffraction grating by rotating the third unit diffraction grating with reference to the first unit diffraction grating, it is possible to prevent the influence of the error from occurring in the extending direction of the grating of the third unit diffraction grating. As a result, it is possible to make the misalignment in the extending direction of the gratings of the unit diffraction gratings other than the first unit diffraction grating at the maximum only the misalignment from the first unit diffraction grating. Therefore, accumulation of misalignment in the extending direction of the grating can be suppressed.

DESCRIPTION OF PREFERRED EMBODIMENTS

Hereinafter, embodiments embodying the present invention will be described with reference to drawings.

First Embodiment

Figure 1:
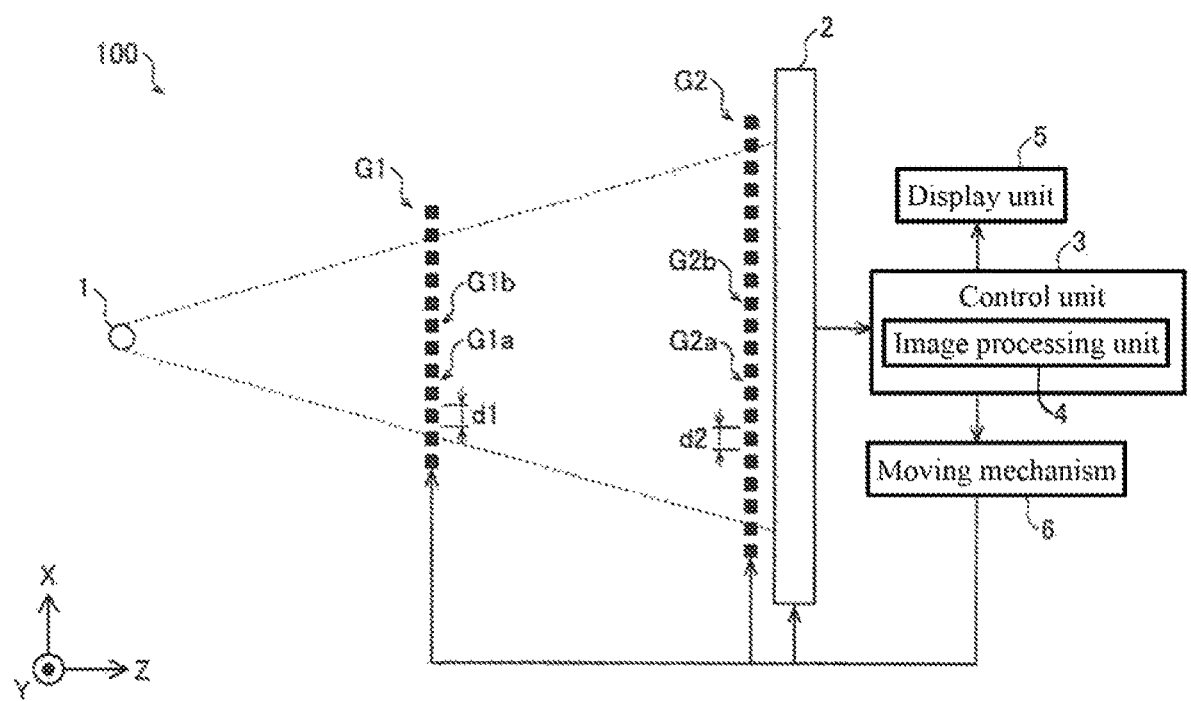
FIG. 1 is a schematic diagram showing an overall configuration of an X-ray phase imaging device provided with an absorption grating according to first and second embodiments of the present invention.

With reference to FIG. 1, a configuration of an X-ray phase imaging device 100 equipped with an absorption grating G2 according to a first embodiment of the present invention will be described. Note that the absorption grating G2 is an example of the "diffraction grating" recited in claims.

(Configuration of X-Ray Phase Imaging Device)

As shown in FIG. 1, the X-ray phase imaging device 100 is provided with an X-ray source 1, a phase grating G1, an absorption grating G2, a detector 2, a control unit 3, a display unit 5, and a moving mechanism 6. In the X-ray phase imaging device 100, the X-ray source 1, the phase grating G1, the absorption grating G2, and the detector 2 are arranged in this order in the irradiation axis direction of the X-ray (optical axis direction, Z direction). The X-ray phase imaging device 100 is a device for capturing an image of an object (not shown) arranged between the X-ray source 1 and the phase grating G1 or between the phase grating G1 and the absorption grating G2.

In this specification, the irradiation axis direction of the X-ray is defined as a Z direction, and directions orthogonal to each other in a plane orthogonal to the Z direction are set as an X direction and a Y direction, respectively.

The X-ray source 1 is configured so as to generate an X-ray by applying a high voltage and irradiate the generated X-ray with a micro-focus.

The phase grating G1 is a diffraction grating that changes the phase of the passing X-ray. The phase grating G1 has slits G1$a$ and X-ray absorbers G1$b$ arranged at a predetermined period (grating pitch) d1 in the X direction. Each of the slit G1$a$ and the X-ray absorber G1$b$ is formed so as to extend in the Y direction.

The phase grating G1 is arranged between the X-ray source 1 and the absorption grating G2, and an X-ray is irradiated thereto. The phase grating G1 is provided to form a self-image 30 (see FIG. 3) by a Talbot effect. When an X-ray having coherence passes through a grating in which slits are formed, an image of the grating (self-image 30) is formed at a position away from the grating by a predetermined distance (Talbot distance). This is called a Talbot effect. The self-image 30 is an interference fringe caused by interference of an X-ray. The self-image 30 is an example of the "periodic pattern" recited in the claims.

The absorption grating G2 is provided with a plurality of unit absorption gratings 20 (see FIG. 2) each having a plurality of X-ray low absorption portions G2$a$ and X-ray high absorption portions G2$b$ arranged at a predetermined grating pitch d2 in the X direction. Each of the X-ray low absorption portion G2$a$ and the X-ray high absorption portion G2$b$ is formed so as to extend in the Y direction. It should be noted that the X-ray low absorption portion G2$a$ is shown like a slit of the unit absorption grating 20 in the figure. Note that each unit absorption grating 20 is an example of the "unit diffraction grating" recited in claims.

The absorption grating G2 is arranged between the phase grating G1 and the detector 2, and an X-ray that passed through the phase grating G1 is irradiated to the absorption grating G2. The absorption grating G2 is arranged at a position away from the phase grating G1 by the Talbot distance. As a result, on the downstream side (in the Z direction) of the absorption grating G2, the self-image 30 of the phase grating G1 and the absorption grating G2 are superimposed, so that a moire pattern (also referred to herein simply as moire) 40 (see FIG. 3), which is an interference fringe having a period d4 larger than the period d2 of the absorption grating G2 is generated.

The detector 2 is configured to detect an X-ray, convert the detected X-ray into an electric signal, and read the converted electric signal as an image signal. The detector 2 is, for example, an FPD (Flat Panel Detector). The detector 2 is composed of a plurality of conversion elements (not shown) and a plurality of pixel electrodes (not shown) arranged on the plurality of conversion elements. The plurality of conversion elements and pixel electrodes are arranged side by side in the X direction and the Y direction at a predetermined period (pixel pitch). The detection signal of the detector 2 is sent to the image processing unit 4 of the control unit 3.

The control unit 3 is a computer configured so as to include a CPU (Central Processing Unit), a ROM (Read Only Memory), a RAM (Random Access Memory), and the like. The control unit 3 is equipped with an image processing unit 4 capable of generating an X-ray image including a moire image in which a moire 40 is imaged. In addition, the control unit 3 is configured such that the phase grating G1 and the absorption grating G2 can be rotated by a predetermined angle in a plane in the X direction and the Y direction plane (X-Y plane) using the moving mechanism 6.

The image processing unit 4 is configured to generate a moire image in which a moire 40 is imaged based on the detection signal sent from the detector 2. And the image processing unit 4 is configured to generate an X-ray image such as, e.g., a reconstructed image (X-ray phase image) based on a phase shift of each image from a plurality of moire images obtained by scanning the absorption grating G2 in the Y direction at constant periodic intervals.

The display unit 5 is configured by, for example, a liquid crystal display. The display unit 5 is configured to display a moire image generated by the image processing unit 4 and an X-ray image reconstructed from the moire image.

The moving mechanism 6 is configured such that the held phase grating G1 and absorption grating G2 can be rotated by a predetermined angle in the X-Y plane via grating holding units (not shown) holding the phase grating G1 and the absorption grating G2 based on a signal sent from the control unit 3. The moving mechanism 6 is, for example, an electric positioning mechanism using a stepping motor or a piezo actuator. This makes it possible to easily change the relative angle of the phase grating G1 and the absorption grating G2.

(Configuration of Absorption Grating)

Next, the configuration of the absorption grating G2 will be described in detail with reference to FIGS. 2 to 5.

Figure 2:
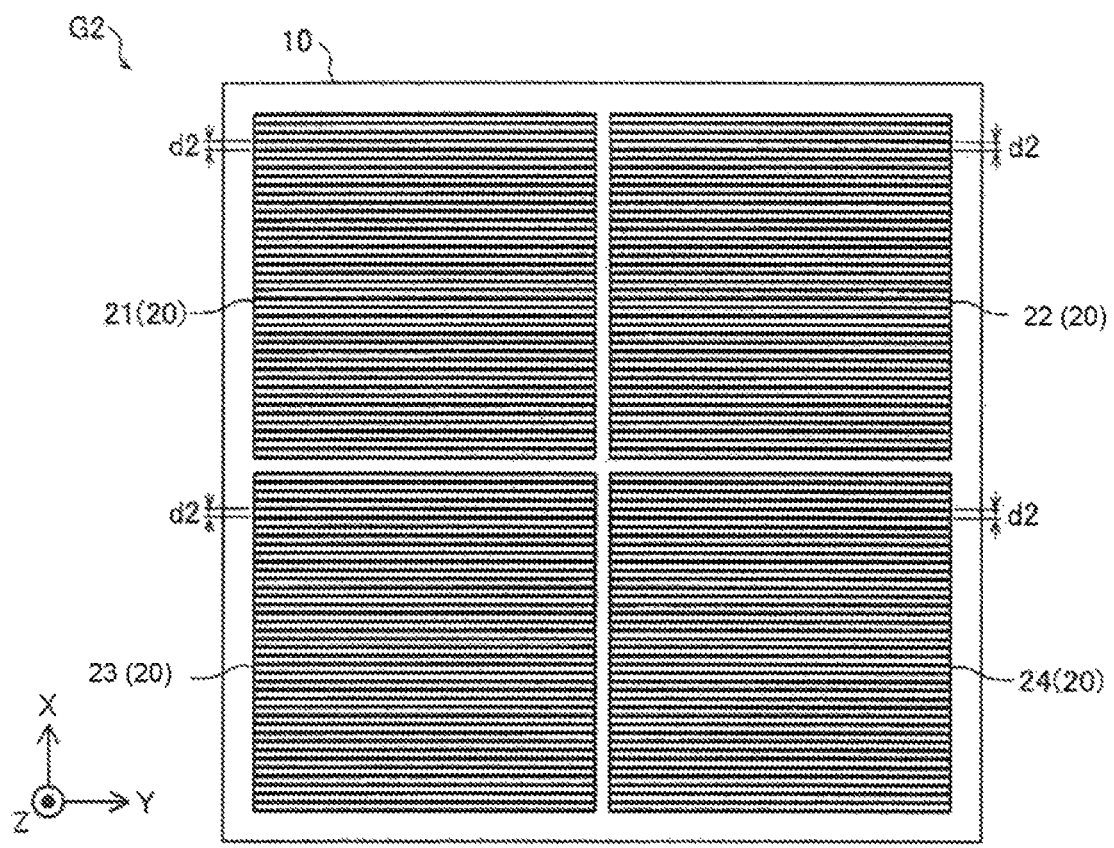
FIG. 2 is a diagram for explaining an absorption grating in which the extending directions of gratings of a plurality of unit absorption gratings are aligned.

The absorption grating G2 is composed of a rectangular substrate 10 and a plurality of unit absorption gratings 20 arranged on the surface of the substrate 10 with a predetermined space therebetween. For example, as shown in FIG. 2, in the absorption grating G2, four rectangular unit absorption gratings 20 (rectangular first unit absorption grating 21, second unit absorption grating 22, third unit absorption grating 23, and fourth unit absorption grating 24) are arranged on one surface of the substrate 10 so as not overlap each other. Note that the first unit absorption grating 21, the second unit absorption grating 22, and the third unit absorption grating 23 are examples of the "first unit diffraction grating", "second unit absorption grating", and "third unit absorption grating", respectively, recited in claims.

The substrate 10 is made of an X-ray low absorber such as a resin. In the unit absorption grating 20, the X-ray low absorption portion G2a made of a silicon or a resin and the X-ray high absorption portion G2b made of a heavy metal, such as gold, are arranged alternately in the X direction. Further, the X-ray low absorption portion G2a and the X-ray high absorption portion G2b are arranged at a predetermined period (grating pitch) d2 in the X direction and are arranged so as to extend substantially in parallel to the Y direction.

In the absorption grating G2 shown in FIG. 2, a first unit absorption grating 21, a second unit absorption grating 22, a third unit absorption grating 23, and a fourth unit absorption grating 24 are arranged on the substrate 10 so that the X-ray low absorption portion G2a and the X-ray high absorption portion G2b are substantially parallel. That is, in the absorption grating G2, a plurality of unit absorption gratings 20 is arranged so that the extending directions of the gratings are aligned. For example, in FIG. 2 and FIG. 3, a plurality of unit absorption gratings 20 are arranged such that the extending directions of the gratings of the first unit absorption grating 21, the second unit absorption grating 22, the third unit absorption grating 23, and the fourth unit absorption grating 24 are aligned in the Y direction.

The plurality of unit absorption gratings 20 are arranged on the substrate 10 and then arranged at predetermined positions of the X-ray phase imaging device 100 in a state in which the absorption grating G2 is configured by being joined to the substrate 10. As the method of joining the plurality of unit absorption gratings 20 and the substrate 10, any one of methods, such as, e.g., a vacuum bonding method, an optical contact method, an anodic oxidation bonding method, and an adhesion method, can be used.

Figure 3:
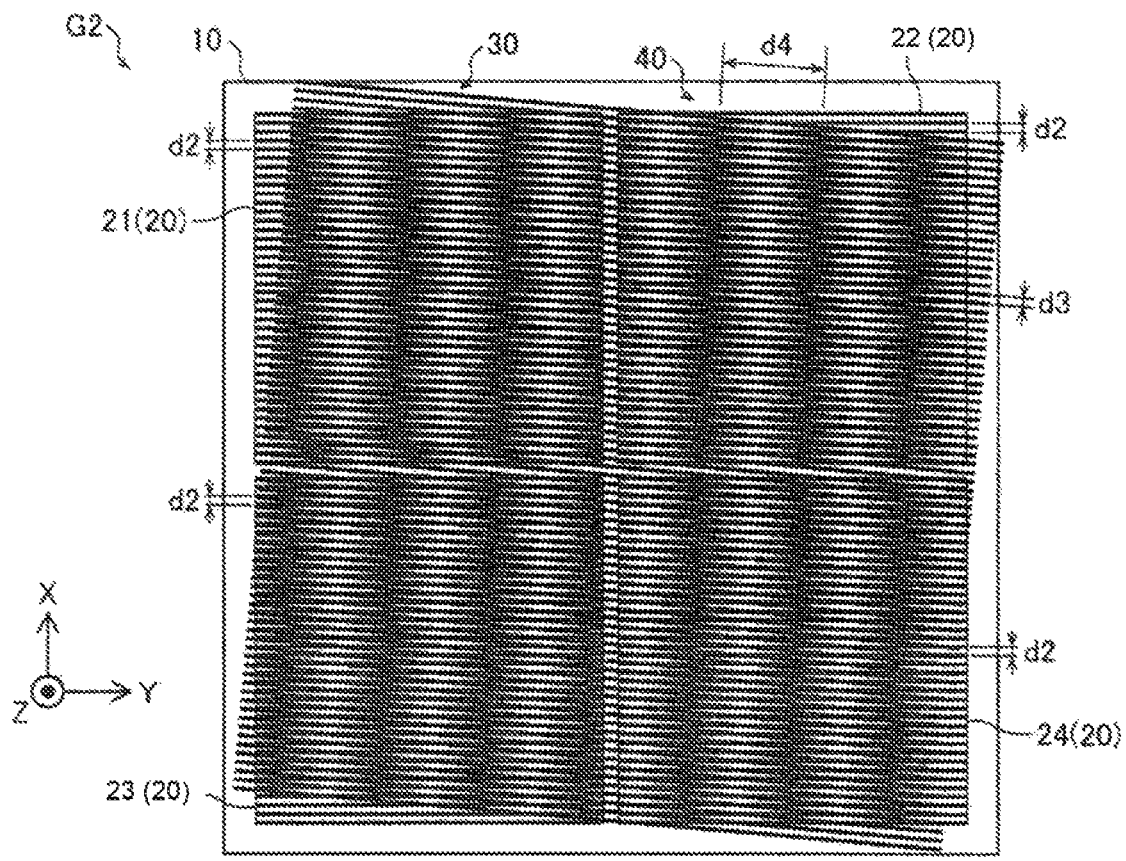
FIG. 3 is a diagram for explaining a moire to be generated in a case in which extending directions of the gratings of a plurality of unit absorption gratings are arranged in an absorption grating.

When a moire 40 is generated using an absorption grating G2 in a state in which a plurality of unit absorption gratings 20 are arranged so that the extending directions of gratings are aligned as shown in FIG. 2, a moire 40 having a period d4 larger than the period d2 is generated as shown in FIG. 3. More specifically, when an X-ray is irradiated from the X-ray source 1, the phase grating G1 having a period d1 irradiated with the X-ray generates a self-image 30 having a period d3 at the position of the Talbot distance (at the position where the absorption grating G2 is arranged in FIG. 1) on the downstream side (in the Z direction) from the phase grating G1.

The self-image 30 and the absorption grating G2 arranged at the position where the self-image 30 is formed and having a period d2 are superimposed, so that a moire 40 which is an interference fringe having a period d4 is generated on the downstream side of the absorption grating G2. This moire 40 shows a difference in the signal strength of X-ray. As shown in FIG. 3, since the moire 40 has the period d4 that is larger than the period d2, it is easy to detect the magnitude of the signal strength of the X-ray even if a detector does not have a very small detection element. Based on this moire 40, an X-ray image such as, e.g., a reconstructed image based on the phase shift of each image is generated.

Figure 4:
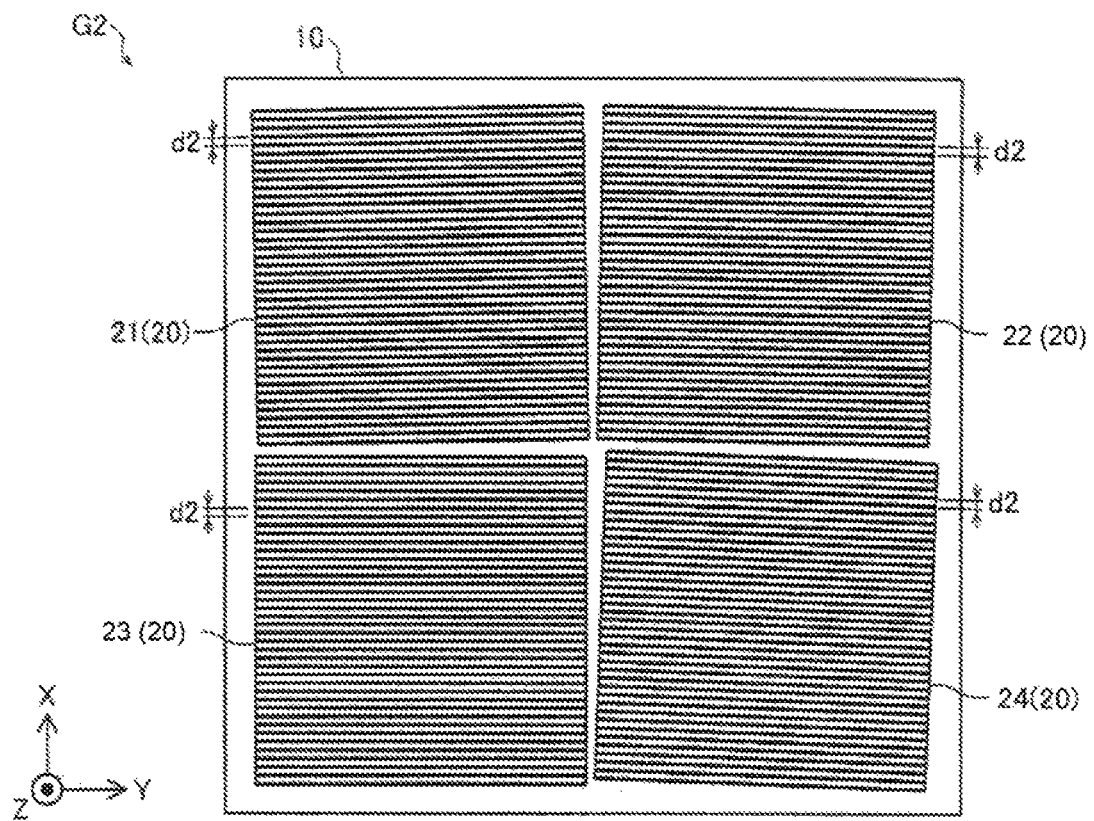
FIG. 4 is a diagram for explaining an absorption grating in which the gratings of a plurality of unit absorption gratings are arranged with their extending directions misaligned from each other.

However, when the X-ray phase imaging device 100 equipped with the absorption grating G2 is actually used, as shown in FIG. 4, a plurality of unit absorption gratings 20 is sometimes in a state in which the extending directions of gratings are misaligned. The cause is considered that in the case of adjusting so that the extending directions of gratings of a plurality of unit absorption gratings 20 are aligned, when it is adjusted so that the extending directions of gratings are directly aligned using a microscope and a marker, since the period d2 of the unit absorption grating 20 is extremely small, the precise adjustment cannot be performed.

Figure 5:
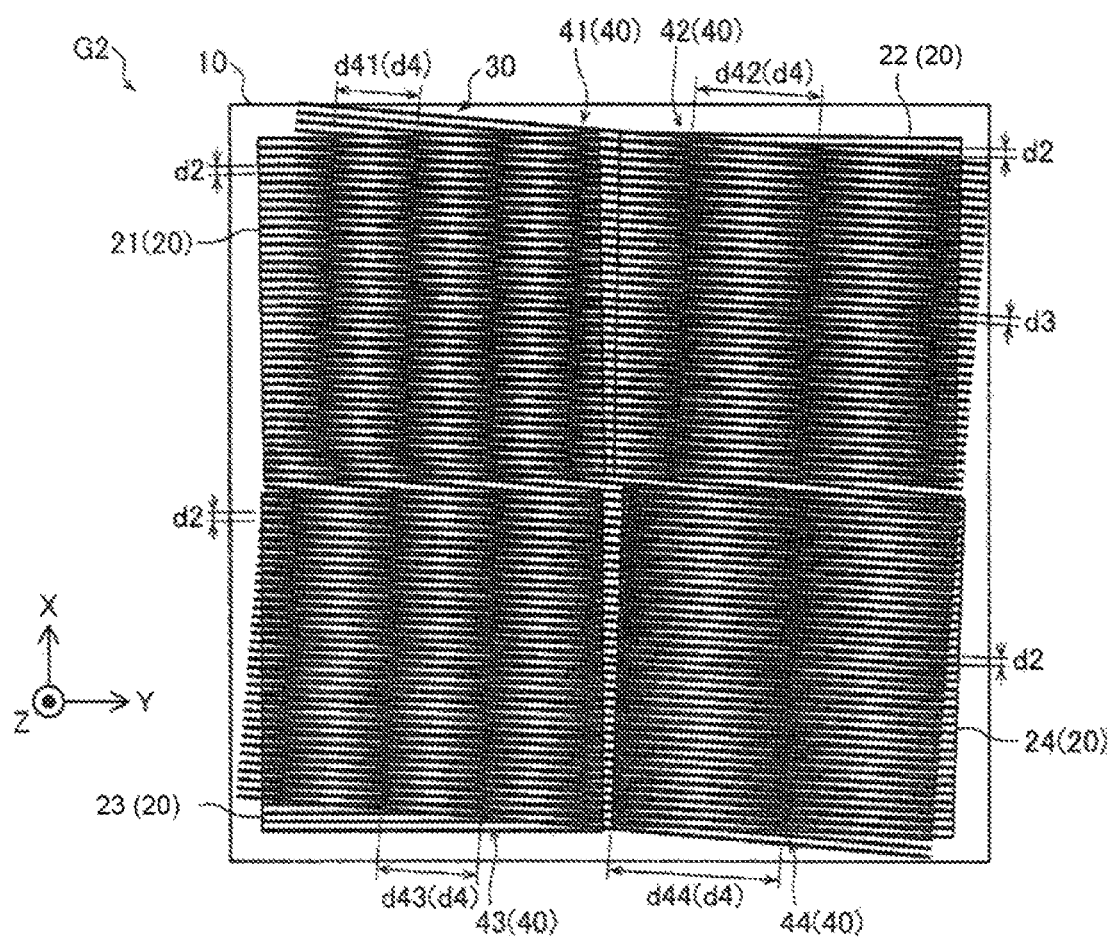
FIG. 5 is a diagram for explaining a moire to be generated in a case in which extending directions of the gratings of a plurality of unit absorption gratings are misaligned in an absorption grating.

When the absorption grating G2 in a state in which the extending directions of gratings of a plurality of unit absorption gratings 20 are misaligned as shown in FIG. 4 is used, different shapes of moires 40 are generated for each unit absorption grating 20 by the self-image 30 and each unit absorption grating 20 as shown in FIG. 5. Specifically, a first moire 41 having a period d41 is generated by the self-image 30 and the first unit absorption grating 21, a second moire 42 having a period d42 is generated by the self-image 30 and the second unit absorption grating 22, a third moire 43 having a period d43 is generated by the self-image 30 and the third unit absorption grating 23, and a fourth moire 44 having a period d44 is generated by the self-image 30 and the fourth unit absorption grating 24.

As shown in FIG. 4, although the misalignment of the extending directions (X directions) of the gratings of the plurality of unit absorption gratings 20 are slight, as shown in FIG. 5, the first moire 41, the second moire 42, the third moire 43, the fourth moire 44, the periods d41, d42, d43, and d44 greatly differ.

As described above, in the absorption grating G2, it is not easy to adjust the extending directions of the gratings so that the extending directions of the gratings of the plurality of unit absorption gratings 20 are aligned, which is likely to cause a large difference in the shape of the generated moire 40 for each part. This results in deterioration of image quality of the X-ray image generated based on the moire image in which the moire 40 is imaged and the moire 40.

Under the circumstances, in a method of producing an absorption grating G2 of the first embodiment according to the present invention which will be described, it is configured to adjust the absorption grating G2 so as to align the extending directions of the gratings of the plurality of unit absorption gratings 20 in order to suppress degradation of image quality in the moire image 40 and the X-ray image.

(Method of Producing Absorption Grating)

Next, with reference to FIG. 1, FIG. 2, and FIG. 6 to FIG. 9, a method of producing an absorption grating G2 of the first embodiment will be described. Note that in this production method, it is possible to adjust so that extending directions of gratings of a plurality of unit absorption gratings 20 are aligned by using the X-ray phase imaging device 100 shown in FIG. 1.

First, a first unit absorption grating 21 is arranged at an appropriate position on one surface of a substrate 10 (the upper left part of the substrate 10 in FIG. 6), the substrate 10 on which the first unit absorption grating 21 at the Talbot distance (at the position where the absorption grating G2 is arranged in FIG. 1) on the downstream side (in the Z direction) from the phase grating G1, and an X-ray is irradiated from an X-ray source 1 to generate a moire 40.

Figure 6:
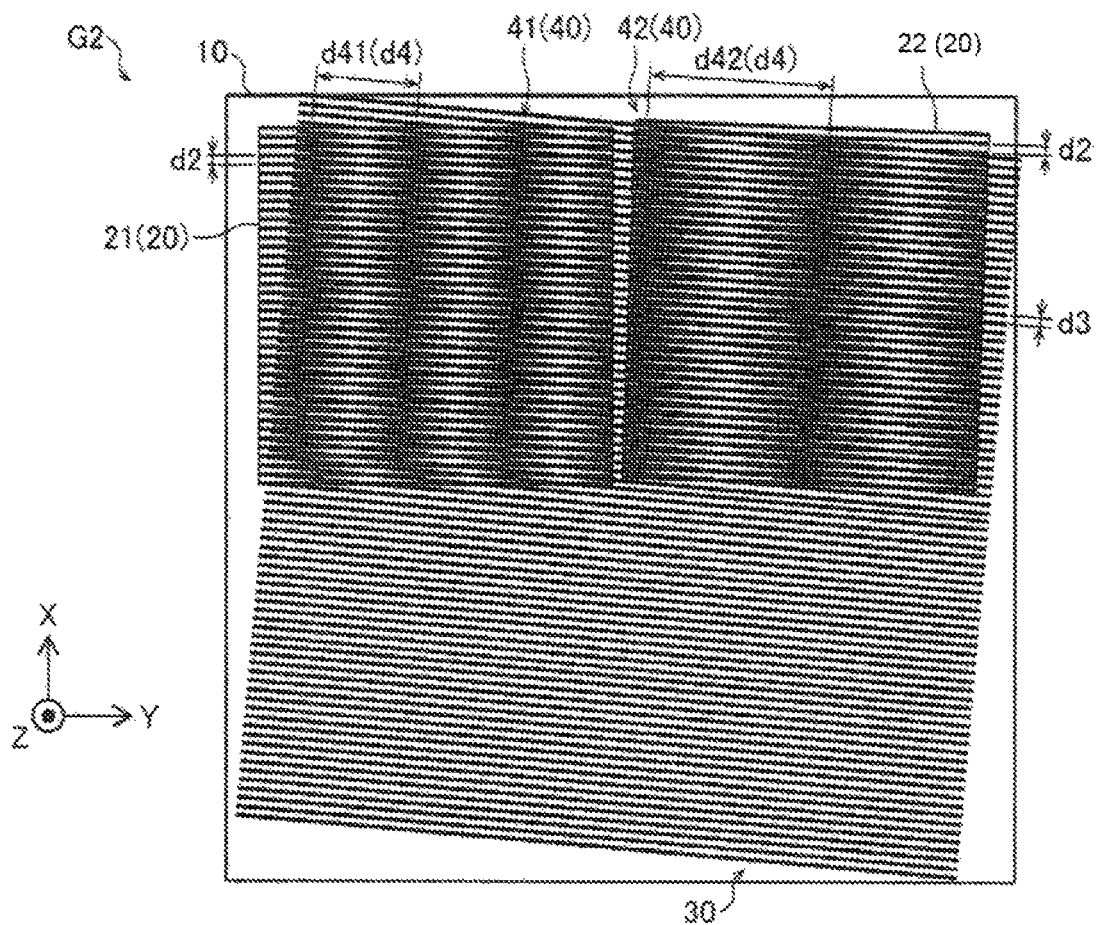
FIG. 6 is a view showing a state before the second unit absorption grating is rotated with respect to the substrate and the first unit absorption grating in the production step of the absorption grating according to the first embodiment.

Then, after joining (fixing) the first unit absorption grating 21 to the substrate 10, as shown in FIG. 6, in a state in which a second unit absorption grating 22 is arranged at a position near the first unit absorption grating 21 on the substrate 10 (on the right side of the first unit absorption grating 21 in FIG. 6) with an appropriate distance, an X-ray is irradiated with the X-ray source 1 to generate a moire 40.

As shown in FIG. 6, since the extending directions of gratings differ between the first unit absorption grating 21 and the second unit absorption grating 22, the period d41 of the first moire 41 generated by the self-image 30 and the first unit absorption grating 21 is significantly different from the period d42 of the second moire 42 generated by the self-image 30 and the second unit absorption grating 22.

So, the second unit absorption grating 22 is rotated using a rotation mechanism (not shown) with respect to the substrate 10 and the first unit absorption grating 21 joined (fixed) to the substrate 10 so that the period d41 of the first moire 41 and the period d42 of the second moire 42 become substantially equal. That is, the second unit absorption grating 22, which is one of the plurality of unit absorption gratings 20, is relatively rotated with respect to the first unit absorption grating 21, which is one of the others of the plurality of unit absorption gratings 20.

It should be noted that the first moire 41 shown in FIG. 6 is not a moire 40 generated in a state in which the first unit absorption grating 21 is joined (fixed) to the substrate 10, but a moire 40 generated when the first unit absorption grating 21 is arranged at an appropriate position on one surface of the substrate 10 (before joining the first unit absorption grating 21 to the substrate 10).

This is because there is a possibility that the shape of the first moire 41 slightly changes due to a slight change in the optical distance from the phase grating G1 to the first unit absorption grating 21 before and after joining the first unit absorption grating 21 to the substrate 10.

In the following description, when comparing moires 40 generated by a plurality of unit absorption gratings 20, it is assumed that each moire 40 image-captured before joining each unit absorption grating 20 to the substrate 10 is used.

Figure 7:
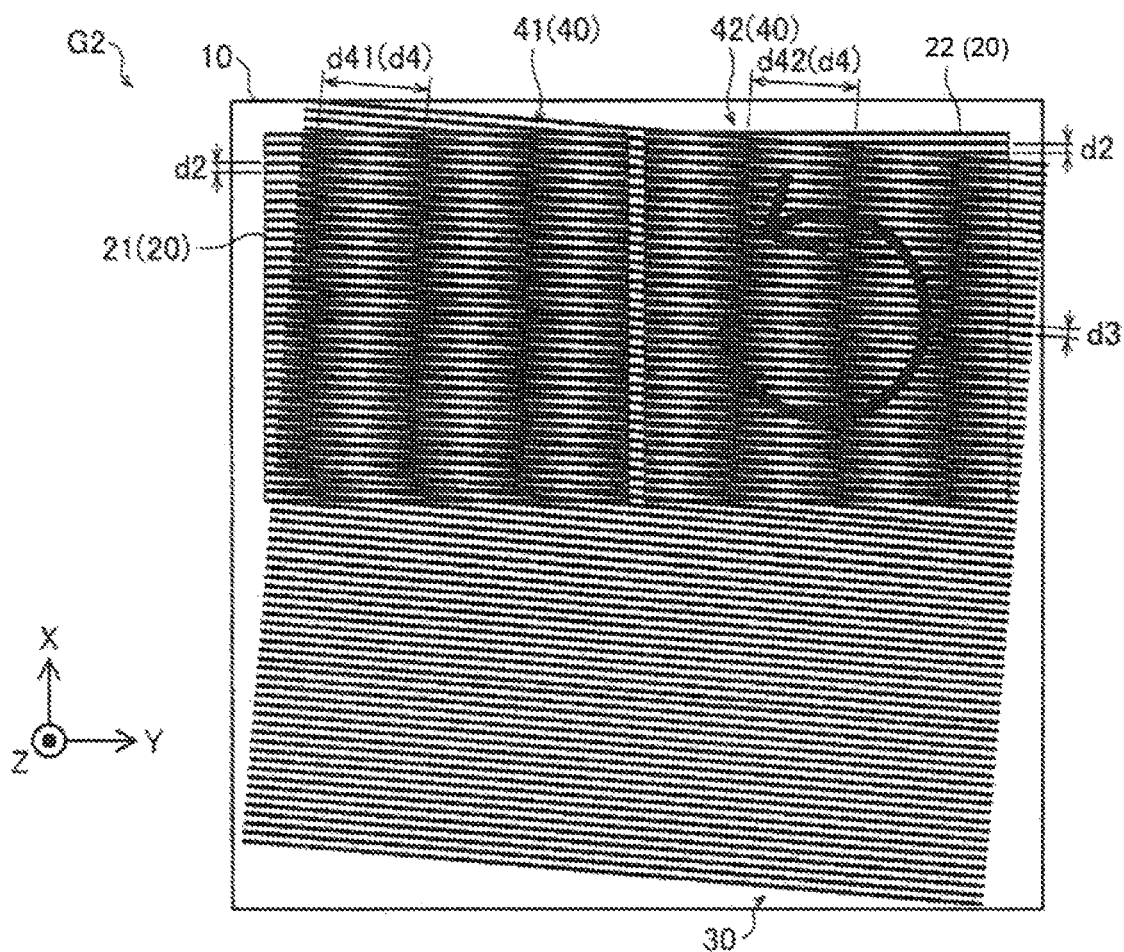
FIG. 7 is a view showing a state after the second unit absorption grating is rotated with respect to the substrate and the first unit absorption grating in the production step of the absorption grating according to the first embodiment.

As shown in FIG. 7, in a state in which the period d41 of the first moire 41 and the period d42 of the second moire 42 are substantially equal to each other, the extending directions of the gratings are aligned in the first unit absorption grating 21 and the second unit absorption grating 22. This is because the period d41 of the first moire 41 and the period d42 of the second moire 42 are larger than the period d2 of the first unit absorption grating 21 and the second unit absorption grating 22, when adjustment is made using the first moire 41 and the second moire 42, the extending directions of gratings of the first unit absorption gratings 21 and the second unit absorption grating 22 can be adjusted with high degree of accuracy.

After arranging the extending directions of the gratings of the first unit absorption grating 21 and the second unit absorption grating 22, the second unit absorption grating 22 is joined (fixed) to the substrate 10. By the steps up to here, it is possible to produce the absorption grating G2 in a state in which the extending directions of gratings of the first unit absorption grating 21 and the second unit absorption grating 22 are aligned.

Figure 8:
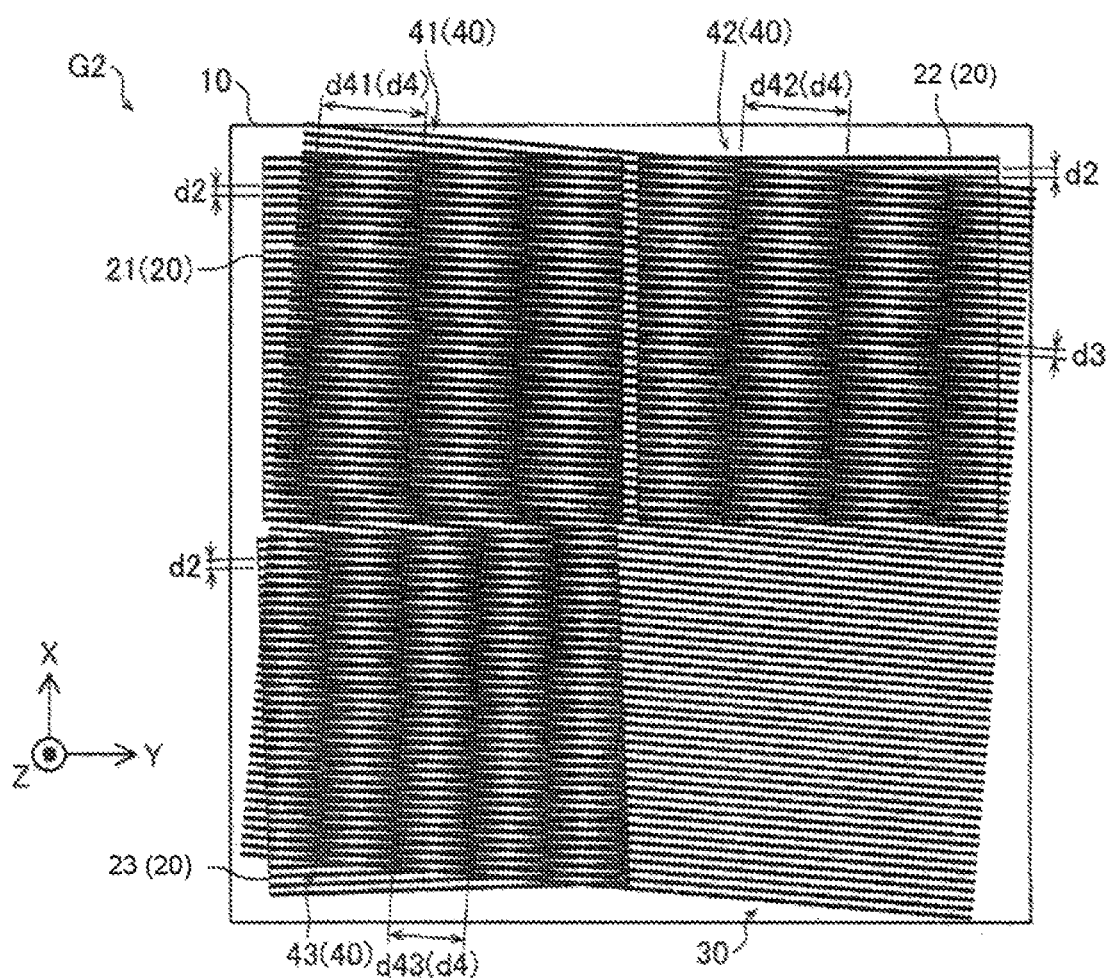
FIG. 8 is a view showing a state before the third unit absorption grating is rotated with respect to the substrate, the first unit absorption grating, and the second unit absorption grating in the production step of the absorption grating according to the first embodiment.
Figure 9:
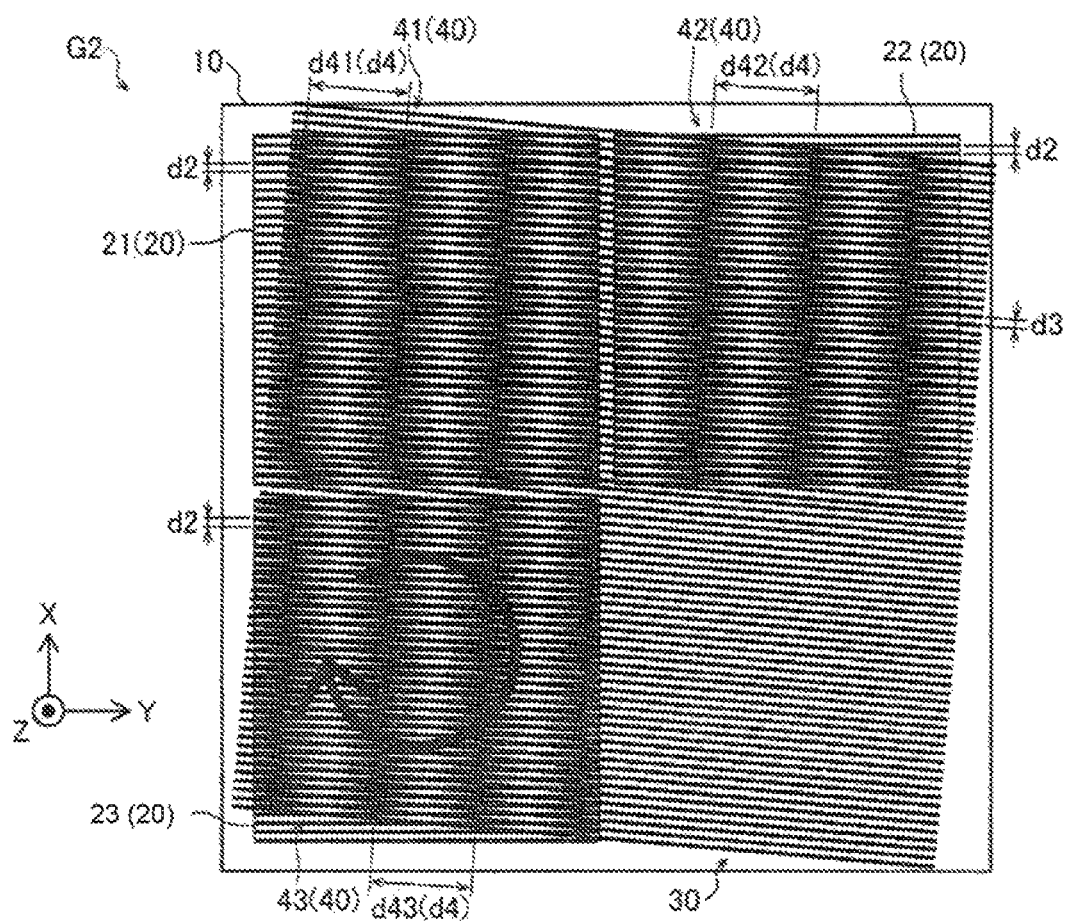
FIG. 9 is a view showing a state after the third unit absorption grating is rotated with respect to the substrate, the first unit absorption grating, and the second unit absorption grating in the production step of the absorption grating according to the first embodiment.

Next, as shown in FIG. 8, in a state in which a third unit absorption grating 23 is arranged at a position near the first unit absorption grating 21 on the substrate 10 (on the lower side of the first unit absorption grating 21 in FIG. 8) with an appropriate distance, an X-ray is irradiated with an X-ray source 1 to generate a moire 40.

Since the extending directions of gratings are misaligned between the first unit absorption grating 21 and the third unit absorption grating 23, the period d41 of the first moire 41 generated by the self-image 30 and the first unit absorption grating 21 is significantly different from the period d43 of the third moire 43 generated by the self-image 30 and the third unit absorption grating 23.

So, the third unit absorption grating 23 is rotated using a rotation mechanism (not shown) with respect to the substrate 10 and the first unit absorption grating 21 joined (fixed) to the substrate 10 so that the period d41 of the first moire 41 and the period d43 of the third moire 43 become substantially equal. At this time, by rotating the third unit absorption grating not with reference to the second unit absorption grating 22 but with reference to the first moire 41 generated by the first unit absorption grating 21, even if there is an error in the step of aligning the extending directions of the first unit absorption grating 21 and the second unit absorption grating 22, it is possible to prevent the influence of the error from occurring in the extending direction of the grating of the third unit absorption grating 23.

After arranging the extending directions of the gratings of the first unit absorption grating 21 and the third unit absorption grating 23, the third unit absorption grating 23 is joined (fixed) to the substrate 10. As for the fourth unit absorption grating 24, by repeating the similar step as for the third unit absorption grating 23, it is possible to align the grating extending directions of the first unit absorption grating 21, the second unit absorption grating 22, the third unit absorption grating 23, and the fourth unit absorption grating 24. That is, as shown in FIG. 2, all of the unit absorption gratings 20 to be joined to the absorption grating G2 can be brought into a state in which the extending directions of gratings are aligned.

Note that, in the first embodiment, since the unit absorption gratings 20 are joined to the same substrate 10, it is assumed that the unit absorption gratings 20 are not misaligned in directions other than the surface (X-Y plane) of the absorption grating G2.

Effects of First Embodiments

In the first embodiment, the following effects can be obtained.

In the method of producing the absorption grating G2 of the first embodiment, as described above, it includes a step of adjusting so that the extending directions of the gratings are aligned by relatively rotating at least one of the plurality of unit absorption gratings 20 with respect to at least one of the others of the plurality of unit absorption gratings 20 based on the shape of the generated moire 40.

By this step, it is possible to produce an absorption grating G2 in which at least two of the plurality of unit absorption gratings 20 are arranged so that the shapes of moires 40 are substantially equal. As a result, it is possible to increase the area of the absorption grating while avoiding degradation of image quality due to the difference in shape of the moire 40. Further, unlike the case in which extending directions of gratings of a plurality of unit absorption gratings 20 are directly adjusted using a microscope and a marker, it is possible to adjust extending directions of gratings of a plurality of unit absorption gratings 20 based on a shape of actually formed moire 40. With this, it is possible to assuredly suppress occurrence of misalignment in extending directions of gratings of a plurality of unit absorption gratings 20.

Further, in the method of producing the absorption grating G2 of the first embodiment, as described above, the plurality of unit absorption gratings 20 includes the first unit absorption grating 21 and the second unit absorption grating 22. The step of relatively rotating at least one of the plurality of unit absorption gratings 20 includes a step of adjusting so that the extending directions of the gratings are aligned by relatively rotating the first unit absorption grating 21 with respect to the second unit absorption grating 22 based on the period d41 of the first moire 41 to be generated by the first unit absorption grating 21 and the self-image 30 and the period d42 of the second moire 42 to be generated by the second unit absorption grating 22 and the self-image 30.

With this, it is possible to align the extending directions of the gratings of the first unit absorption grating 21 and the second unit absorption grating 22 by adjusting so that the extending directions of the gratings of the first unit absorption grating 21 and the second unit absorption grating 22 are aligned based on the period d41 of the first moire 41 and the period d42 of the second moire 42 which are larger than the period d2 of the grating of the first unit absorption grating 21 and the period d2 of the grating of the second unit absorption grating 22.

Further, in the method of producing an absorption grating G2 of the first embodiment, as described above, the method further includes a step of fixing the first unit absorption grating 21 with respect to the substrate 10. The step of relatively rotating the first unit absorption grating 21 with respect to the second unit absorption grating 22 includes a step of adjusting so that the extending directions of the gratings are aligned by relatively rotating the second unit absorption grating 22 with respect to the substrate 10 and the first unit absorption grating 21 fixed to the substrate 10, and a step of fixing the second unit absorption grating 22 with respect to the substrate 10 after the step of adjusting so that the extending directions of the gratings are aligned by relatively rotating the second unit absorption grating 22 with respect to the first unit absorption grating 21.

With these steps, since the first unit absorption grating 21 is fixed to the substrate 10 before the step of relatively rotating the first unit absorption grating 21 with respect to the second unit absorption grating 22, even if the first unit absorption grating 21 is relatively rotated with respect to the second unit absorption grating 22, the position of the first unit absorption grating 21 with respect to the substrate 10 does not change. As a result, it is possible to suppress occurrence of misalignment of the extending directions of the gratings of the first unit absorption grating 21 and the second unit absorption grating 22. Further, after aligning the extending directions of the gratings of the first unit absorption grating 21 and the second unit absorption grating 22, the second unit absorption grating 22 is fixed to the substrate 10. Therefore, it is possible to assuredly produce the absorption grating G2 in a state in which the extending directions of the gratings of the first unit absorption grating 21 and the second unit absorption grating 22 are aligned.

Further, in the method of producing the absorption grating G2 of the first embodiment, the step of adjusting so that the extending directions of the gratings are aligned by relatively rotating the second unit absorption grating 22 with respect to the first unit absorption grating 21 fixed to the substrate 10. With this, it is sufficient to rotate only the second unit absorption grating 22 which is not fixed with reference to the substrate 10 to which the first unit absorption grating 21 fixed. Therefore, it is possible to easily perform the step of relatively rotating the substrate 10 and the second unit absorption grating 22.

Further, in the method of producing an absorption grating G2 of the first embodiment, as described above, the plurality of unit absorption gratings 20 further includes the third unit absorption grating 23 other than the first unit absorption grating 21 and the second unit absorption grating 22. The method further includes step of adjusting so that the extending directions of the gratings are aligned by relatively rotating the third unit absorption grating 23 with respect to the first unit absorption grating 21 or the second unit absorption grating 22 fixed to the substrate 10 after the step of fixing the second unit absorption grating 22 to the substrate 10, and a step of fixing the third unit absorption grating 23 with respect to the substrate 10 after the step of adjusting so that the extending directions of the gratings are aligned by relatively rotating the third unit absorption grating 23 with respect to the first unit absorption grating 21 or the second unit absorption grating 22.

By repeating these steps, it is possible to sequentially fix the plurality of unit absorption gratings 20 other than the first unit absorption grating 21 with respect to the substrate 10 to which the first unit absorption grating 21 is fixed in a state in which the extending directions of the gratings are aligned. As a result, it is possible to obtain an absorption grating G2 in which the extending directions of the gratings are aligned for all of the plurality (three or more) unit diffraction gratings 20.

Further, in these steps, by rotating the third unit absorption grating not with reference to the second unit absorption grating 22 but with reference to the first unit absorption grating 21, even if there is an error in the step of aligning the extending directions of the gratings of the second unit absorption grating 22 and the first unit absorption grating 21, it is possible to prevent the influence of the error from occurring in the extending direction of the grating on the third unit absorption grating 23. As a result, misalignment in the extending directions of gratings of unit absorption gratings 20 other than first unit absorption grating 21 can be made to be a misalignment with the first unit absorption grating 21 at most. Therefore, accumulation of the misalignments in the extending directions of the gratings can be suppressed.

Second Embodiment

Figure 10:
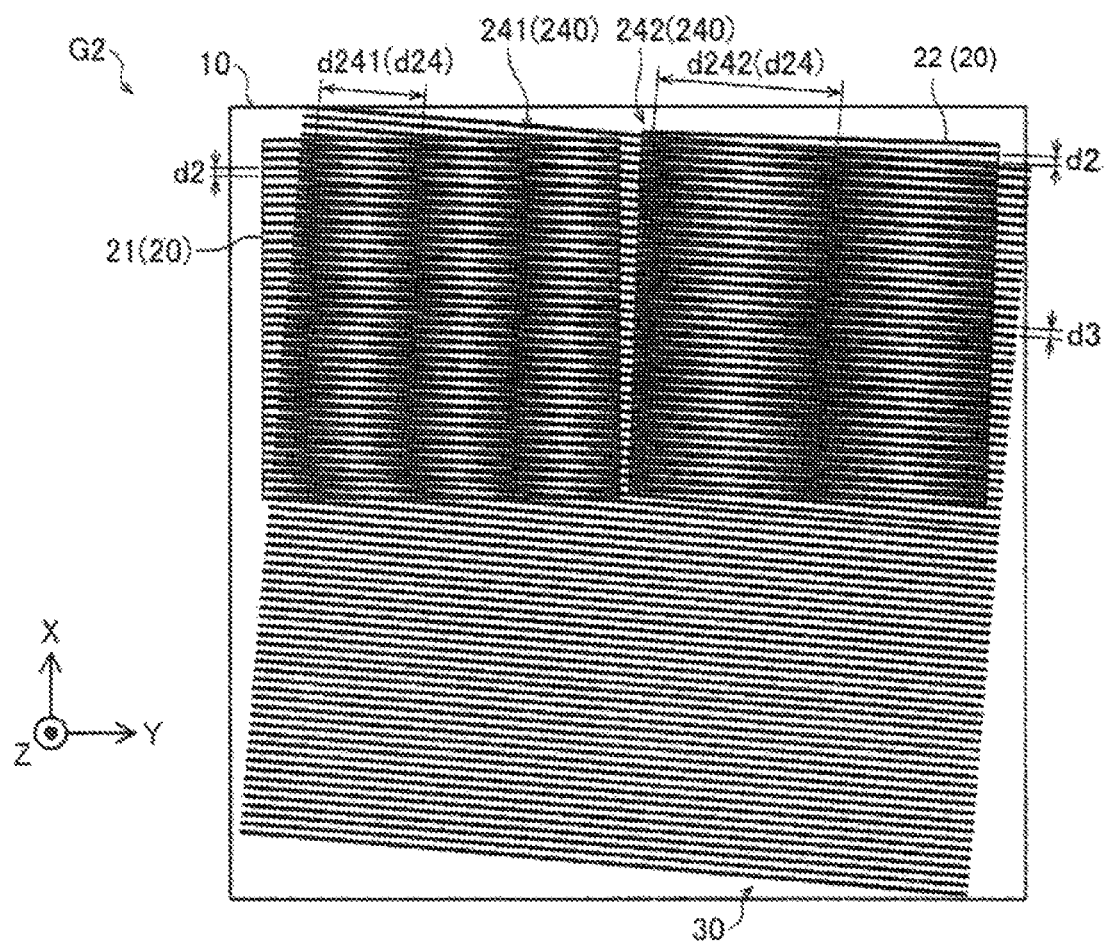
FIG. 10 is a view showing a state before the substrate and the first unit absorption grating are rotated with respect to the second unit absorption grating in the production step of the absorption grating according to the second embodiment.

Next, a second embodiment will be described with reference to FIGS. 10 and 11. In this second embodiment, unlike the production method of the first embodiment, the description will be directed to the case of producing an absorption grating by rotating a substrate and a unit absorption grating fixed to the substrate with respect to unit absorption gratings not fixed. Note that the same reference numerals are allotted to the same configurations as those of the first embodiment in the drawings, and the description thereof will be omitted.

(Method of Producing Absorption Grating)

First, in the same manner as in the first embodiment, a first unit absorption grating 21 is arranged at an appropriate position on one surface of the substrate 10 (upper left portion of the substrate 10 in FIG. 10), and the substrate 10 on which the first unit absorption grating 21 is arranged is arranged at the Talbot distance on the downstream side (in the Z direction) from the phase grating G1. Thereafter, an X-ray is irradiated with an X-ray source 1 to generate a moire 240. Then, after joining (fixing) the first unit absorption grating 21 to the substrate 10, as shown in FIG. 10, in a state in which a second unit absorption grating 22 is arranged at a position near the first unit absorption grating 21 on the substrate 10 (on the right side of the first unit absorption grating 21 in FIG. 10) with an appropriate distance, an X-ray is irradiated with the X-ray source 1 to generate a moire 240.

Since the extending directions of gratings are misaligned between the first unit absorption grating 21 and the second unit absorption grating 22, the period d241 of the first moire 241 generated by the self-image 30 and the first unit absorption grating 21 is significantly different from the period d242 of the second moire 242 generated by the self-image 30 and the second unit absorption grating 22. Therefore, the substrate 10 and the first unit absorption grating 21 joined to the substrate 10 are rotated with respect to the second unit absorption grating 22 by rotating the substrate 10 itself in a state in which the second unit absorption grating 22 is held with a holding mechanism (not shown) so that the period d241 of the first moire 241 and the period d242 of the second moire 242 become substantially equal to each other.

Figure 11:
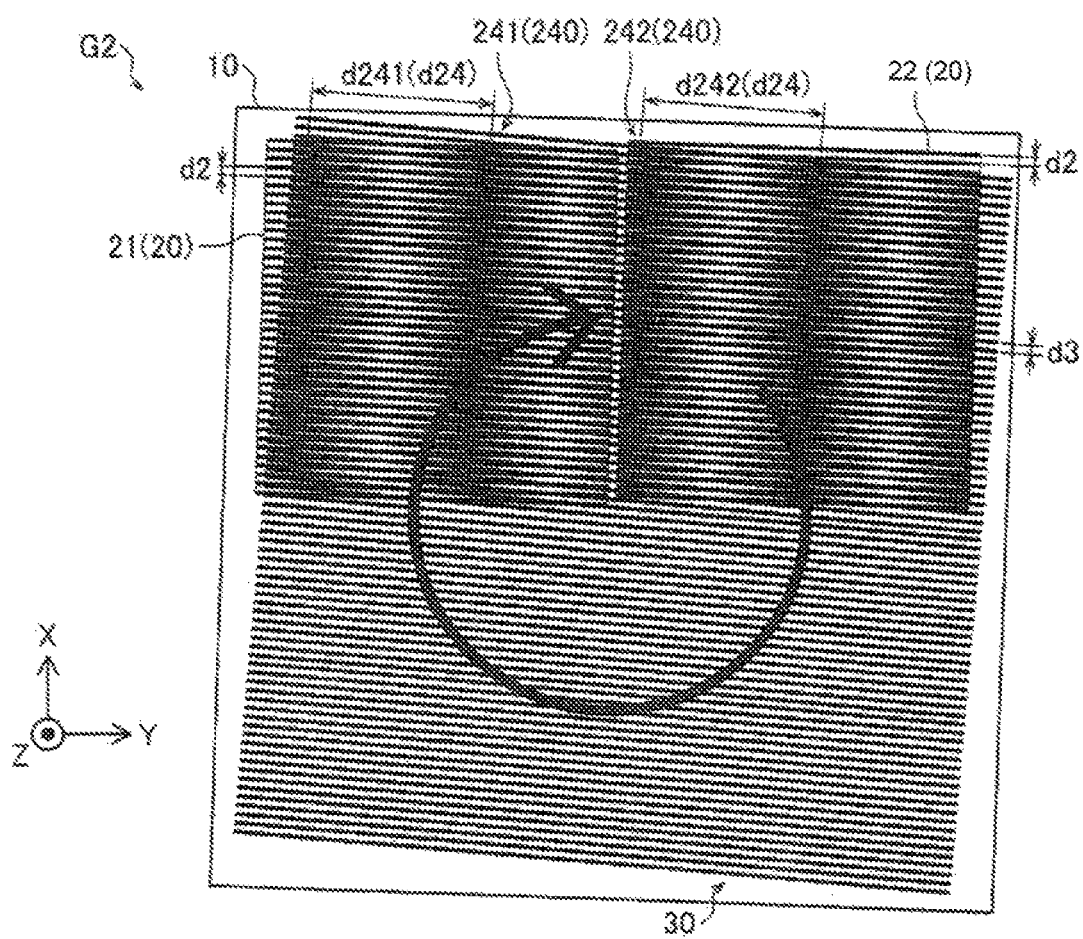
FIG. 11 is a view showing a state after the substrate and the first unit absorption grating are rotated with respect to the second unit absorption grating in the production step of the absorption grating according to the second embodiment.

As shown in FIG. 11, in a state in which the period d241 of the first moire 241 and the period d242 of the second moire 242 are substantially equal to each other, the extending directions of the gratings are aligned in the first unit absorption grating 21 and the second unit absorption grating 22. After aligning the extending directions of the gratings of the first unit absorption grating 21 and the second unit absorption grating 22, the second unit absorption grating 22 is joined (fixed) to the substrate 10. By the steps up to here, in the same manner as in the first embodiment, it is possible to produce the absorption grating G2 in a state in which the extending directions of the gratings of the first unit absorption grating 21 and the second unit absorption grating 22 are aligned. For the same reason as in the first embodiment, the first moire 241 shown in FIG. 11 is a moire 240 generated when the first unit absorption grating 21 is arranged at an appropriate position on one surface of the substrate 10 (before joining the first unit absorption grating 21 to the substrate 10).

Then, in the same manner as in the first embodiment, by repeating these steps for other unit absorption gratings 20, all of the unit absorption gratings 20 to be joined to the absorption grating G2 can be brought into a state in which the extending directions of gratings are aligned.

Other configurations of the second embodiment are the same as those of the first embodiment.

Effects of the Second Embodiments

In the second embodiment, the following effects can be obtained.

In the method of producing the absorption grating G2 of the second embodiment, the step of adjusting so that the extending directions of the gratings are aligned by relatively rotating the second unit absorption grating 22 with respect to the first unit absorption grating 21 fixed to the substrate 10 includes a step of rotating the substrate 10 and the first unit absorption grating 21 in a state in which the second unit absorption grating 22 is fixed.

Accordingly, since it is only required to rotate the substrate 10 with reference to the second unit absorption grating 22, by rotating the substrate 10 with respect to the second unit absorption grating 22 in a state in which the second unit absorption grating 22 is held, it is possible to easily perform the step of relatively rotating the substrate 10 with respect to the second unit absorption grating 22. Further, in cases where a device configured such that an absorption grating G2 is rotatable in a grating plane in order to change the shape of moire 40 is used for an X-ray phase imaging device 100 of the present invention, it is possible to rotate the substrate 10 in a grating plane. With this, by using the X-ray phase imaging device 100, in a state in which the second unit absorption grating 22 is held, it is possible to rotate the substrate 10 and the first unit absorption grating 21 fixed to the substrate 10 without separately providing a rotation mechanism.

Other effects of the second embodiment are the same as those of the first embodiment.

Modified Embodiment

It should be understood that the embodiments disclosed here are examples in all respects and are not restrictive. The scope of the present invention is shown by the scope of the claims rather than the descriptions of the embodiments described above, and includes all changes (modifications) within the meaning of equivalent and the scope of claims.

In the first and second embodiments, an example is shown in which only the misalignment in the extending directions of gratings of the unit absorption gratings 20 on the surface of absorption grating G2 are adjusted on the assumption that the extending directions of gratings are not misaligned in the directions other than the directions on the plane of the absorption grating G2 (X-Y plane). However, the present invention is not limited thereto. Even in cases where the extending directions of the gratings of the plurality of unit absorption gratings 20 are misaligned in directions other than directions on the X-Y plane, it is possible to align the directions of the gratings of the plurality of unit absorption gratings 20 by relatively rotating an arbitrary unit absorption grating 20 with respect to at least one unit absorption grating 20 of the plurality of unit absorption gratings 20 (for example, rotating the unit absorption grating 20 in the direction of the rotation axis intersecting the X-Y plane) so that the shapes of the moires 40 and 240 generated by the plurality of unit absorption gratings 20 are substantially equal to each other.

In the second embodiment, an example is shown in which the self-image 30 is not rotated in the step of relatively rotating the unit absorption grating 20 not fixed to the substrate 10 with respect to the substrate 10 and the unit absorption grating 20 fixed to the substrate 10, but the present invention is not limited thereto. In cases where the unit absorption grating 20 not fixed to the substrate 10 is relatively rotated with respect to the substrate 10 and the unit absorption grating 20 fixed to the substrate 10, the self-image 30 may be rotated together. In this case, the self-image 30 can be rotated by rotating the phase grating G1 in the X-Y plane. With this, for example, by rotating the self-image 30 so that the periods d4 and d24 of the moires 40 become large, it is possible to more assuredly align the extending directions of the gratings of the plurality of unit absorption gratings 20.

Further, in the first and second embodiments, an example is shown in which when the third unit absorption grating 23 is relatively rotated with respect to the substrate 10 and the first unit absorption grating 21 and the second unit absorption grating 22 joined to the substrate 10, the first unit absorption grating 21 is rotated with reference to the first moire 41 and 241 generated by the first unit absorption grating 21. But, the present invention is not limited thereto. In the present invention, the third unit absorption grating 23 may be rotated with reference to the second moire 42 and 242 generated by the second unit absorption grating 22.

Similarly, when the fourth unit absorption grating 24 is relatively rotated with respect to the substrate 10, the first unit absorption grating 21, the second unit absorption grating 22, and the third unit absorption grating 23, which are joined to the substrate 10, the fourth unit absorption grating 24 may be rotated with reference to the moire 40 and 240 corresponding to either the second unit absorption grating 22 or the third unit absorption grating 23.

In the first and second embodiments, in the step of relatively rotating the second unit absorption grating 22 with respect to the substrate 10 and the first unit absorption grating 21 fixed to the substrate 10, an example is shown in which in a state in which the second unit absorption grating 22 or either the substrate 10 or the first unit absorption grating 21 is fixed, the other is rotated. But, the present invention is not limited thereto. In the present invention, the second unit absorption grating 22 and both the substrate 10 and the first unit absorption grating 21 may be simultaneously rotated. Further, it may be configured such that two or more unit absorption gratings 20 are simultaneously rotated with respect to one of the plurality of unit absorption gratings 20.

Further, in the first and second embodiments, the absorption grating G2 includes four unit absorption gratings 20, but the present invention is not limited thereto. In the present invention, an arbitrary number of a plurality of sheets can be arranged according to the shape and size of the unit absorption grating 20 and the absorption grating G2.

Further, in the first and second embodiments, when comparing the shape of the moire 41 to be generated by the first unit absorption grating 21 and the shape of the moire 40 to be generated by the unit absorption grating 20 other than the first unit absorption grating 21, before joining (fixing) the first unit absorption grating 21 to the substrate 10, the moire 41 generated by the self-image 30 and the first unit absorption grating 21 is used. But, the present invention is not limited thereto. In the present invention, in cases where the difference of the shapes of the moire 40 generated by the unit absorption grating 20 is small enough to be ignored before and after joining the unit absorption grating 20 to the substrate 10, a moire 41 generated by the self-image 30 and the first unit absorption grating 21 may be used after joining (fixing) the first unit absorption grating 21 to the substrate 10.

Further, in the first and second embodiments, an example is shown in which the self-image 30 for generating a moire 40 and 240 by being superimposed with the absorption grating G2 produced according to the present invention is generated by the phase grating G1, the present invention is not limited thereto. In the present invention, since the self-image 30 only needs to be a stripe pattern, an absorption grating instead of the phase grating G1 may be used for a grating for generating a moire 40 and 240 by being superimposed with the absorption grating G2.

Further, in the first and second embodiments, in the X-ray phase imaging device 100 for generating a moire 40 and 240 from the absorption grating G2 produced according to the present invention, an example is shown in which the X-ray source 1 irradiates with a micro-focus. However, the present invention is not limited to this example. In the present invention, as an X-ray phase imaging device for generating a moire 40 and 240 from the absorption grating G2, a multi slit which is a grating capable of micro-focusing the X-ray irradiated from the X-ray source 1 may be further provided between the X-ray source 1 and the phase grating G1. In this case, since the X-ray source need not narrow down the focus, an X-ray having higher X-ray intensity can be irradiated than the X-ray source 1 of the X-ray phase imaging device 100 of the first and second embodiments.

Further, in the first and second embodiments, an example is shown in which the diffraction grating produced according to the present invention is used as the absorption grating G2 to be arranged between the phase grating G1 and the detector 2, but the present invention is not limited thereto. In the present invention, the diffraction grating may be used as the phase grating G1 disposed between the X-ray source 1 and the detector 2. Also, it may also be used for a multi slit to be arranged between the X-ray source 1 and the phase grating G1.

The invention claimed is:

1. A method of producing a diffraction grating with a phase imaging apparatus comprising a first diffraction grating for forming a periodic pattern from X-rays emitted from an X-ray source and a second diffraction grating for interfering with the periodic pattern of the first diffraction grating, the second diffraction grating including a plurality of unit diffraction gratings, comprising:
    generating a moire by interfering between a plurality of unit diffraction gratings of the second diffraction grating and the periodic pattern formed by the first diffraction gratin; and
    aligning at least one of the plurality of unit diffraction gratings with respect to another of the plurality of unit diffraction gratings by relatively rotating the at least one of the plurality of unit diffraction gratings with respect to the another unit diffraction grating of the plurality of unit diffraction gratings based on a status of the moire generated.

2. The method of producing a diffraction grating as recited in claim 1, wherein
    the plurality of unit diffraction gratings includes a first unit diffraction grating and a second unit diffraction grating, and
    relatively rotating the at least one of the plurality of unit diffraction gratings includes aligning extending directions of the first unit diffraction grating and the second unit diffraction grating by relatively rotating the first unit diffraction grating with respect to the second unit diffraction grating based on a period of a first moire generated by the first unit diffraction grating and the periodic pattern and a period of a second moire generated by the second unit diffraction grating and the periodic pattern.

3. The method of producing a diffraction grating as recited in claim 2, further comprising fixing the first unit diffraction grating with respect to a substrate of the second diffraction grating, wherein relatively rotating the first unit diffraction grating with respect to the second unit diffraction grating includes aligning extending directions of absorption portions of the first unit diffraction grating and the second unit diffraction grating by relatively rotating the second unit diffraction grating with respect to the substrate with the first unit diffraction grating fixed to the substrate; and wherein the method further comprises fixing the second unit diffraction grating with respect to the substrate with the extending directions of the absorption portions of the first unit diffraction grating and the second unit diffraction grating aligned.

4. The method of producing a diffraction grating as recited in claim 3, wherein relatively rotating the first unit diffraction grating with respect to the second unit diffraction grating comprises rotating the second unit diffraction grating in a state in which the substrate of the second diffraction grating and the first unit diffraction grating are fixed.

5. The method of producing a diffraction grating as recited in claim 3, wherein relatively rotating the first unit diffraction grating with respect to the second unit diffraction grating comprises rotating the substrate and the first unit diffraction grating together in a state in which the second unit diffraction grating is fixed.

6. The method of producing a diffraction grating as recited in claim 3, wherein the plurality of unit diffraction gratings further includes a third unit diffraction grating and the method further comprises:

with the first and second unit diffraction gratings fixed to the substrate, relatively rotating the third unit diffraction grating with respect to the first unit diffraction grating and the second unit diffraction grating in a state in which the first unit diffraction grating and the second unit diffraction grating are fixed to the substrate; and fixing the third unit diffraction grating with respect to the substrate after relatively rotating the third unit diffraction grating so that the extending directions of the absorption portions of the first, second and third unit diffraction gratings are aligned with the first, second and third unit diffraction gratings fixed with respect to the substrate.

7. The method of claim 1, wherein the second diffraction grating is an absorption grating.

8. The method of claim 1, wherein the second diffraction grating is a phase grating.

9. The method of claim 2, wherein the second diffraction grating is an absorption grating.

10. The method of claim 2, wherein the second diffraction grating is a phase grating.

11. The method of claim 2, further comprising fixing the first unit diffraction grating and the second unit diffraction grating to a substrate of the second diffraction grating so that absorption portions of the first unit diffraction grating and the second unit diffraction grating extend in a first direction with respect to the substrate.

12. The method of claim 11, wherein the first unit diffraction grating and the second unit diffraction grating are adjacent to each other in the first direction on the substrate.

13. The method of claim 11, wherein the first unit diffraction grating and the second unit diffraction grating are adjacent to each other in a second direction that is perpendicular to the first direction on the substrate.

14. The method of claim 11, wherein the first unit diffraction grating and the second unit diffraction grating are neither adjacent to each other in the first direction on the substrate nor adjacent to each other in a second direction that is perpendicular to the first direction on the substrate.

15. The method of claim 2, wherein relatively rotating the first unit diffraction grating with respect to the second unit diffraction grating comprises matching the periods of the first and second moires by adjusting at least one of the periods of the first and second moires.

16. The method of claim 2, wherein relatively rotating the first unit diffraction grating with respect to the second unit diffraction grating comprises relatively rotating at least one of the first unit diffraction grating and the second unit diffraction grating with respect to the periodic pattern.

17. The method of claim 16, further comprising generating a self-image as the periodic pattern by irradiating X-rays onto the first grating.

18. The method of claim 17, further comprising arranging the first unit diffraction grating and the second unit diffraction grating on a substrate of the second diffraction grating that is spaced a predetermined distance away from the first grating.

* * * * *